United States Patent
Longo et al.

(10) Patent No.: US 11,861,176 B2
(45) Date of Patent: Jan. 2, 2024

(54) PROCESSING OF INPUT/OUPUT OPERATIONS BY A DISTRIBUTED STORAGE SYSTEM BASED ON LATENCIES ASSIGNED THERETO AT THE TIME OF RECEIPT

(71) Applicant: NetApp, Inc., Sunnyvale, CA (US)

(72) Inventors: Austino Longo, Lafayette, CO (US); Randolph W. Sterns, Arvada, CO (US)

(73) Assignee: NetApp, Inc., San Jose, CA (US)

( * ) Notice: Subject to any disclaimer, the term of this patent is extended or adjusted under 35 U.S.C. 154(b) by 186 days.

(21) Appl. No.: 17/239,209

(22) Filed: Apr. 23, 2021

(65) Prior Publication Data

US 2022/0342559 A1 Oct. 27, 2022

(51) Int. Cl.
*G06F 3/06* (2006.01)

(52) U.S. Cl.
CPC ............ *G06F 3/0613* (2013.01); *G06F 3/064* (2013.01); *G06F 3/067* (2013.01); *G06F 3/0611* (2013.01); *G06F 3/0635* (2013.01)

(58) Field of Classification Search
CPC ...... G06F 3/061; G06F 3/0611; G06F 3/0613; G06F 3/0635; G06F 3/064; G06F 3/0659; G06F 3/067; G06F 9/4887; G06F 13/161; G06F 13/1642
USPC ........ 370/232, 233, 234, 252, 253; 709/225, 709/235; 710/5, 6, 36, 39, 45, 58, 59, 60, 710/74, 117; 711/154, 167; 718/102, 718/105

See application file for complete search history.

(56) References Cited

U.S. PATENT DOCUMENTS

| | | | | |
|---|---|---|---|---|
| 9,304,951 | B1* | 4/2016 | Chatterjee | G06F 11/3034 |
| 2008/0298321 | A1* | 12/2008 | Lee | H04L 47/70 370/331 |
| 2012/0324466 | A1* | 12/2012 | He | G06F 9/50 718/104 |
| 2013/0227111 | A1* | 8/2013 | Wright | G06F 11/3495 709/223 |
| 2019/0251273 | A1* | 8/2019 | Slik | G06F 21/604 |
| 2020/0073554 | A1* | 3/2020 | Doster | G06F 3/0673 |
| 2020/0334163 | A1* | 10/2020 | Shergill | G06F 11/3409 |
| 2022/0027055 | A1* | 1/2022 | Tanakamaru | G06F 3/0653 |

* cited by examiner

*Primary Examiner* — Ilwoo Park
(74) *Attorney, Agent, or Firm* — JafferyWatson Mendonsa & Hamilton LLP

(57) ABSTRACT

Systems and methods are described for smoothing-out latency of IO operations processed by a distributed storage system. In some examples, latency is distributed among IO operations to more evenly spread processing of the IO operations over an IO processing interval. A target latency for IO operations for a volume of a distributed storage system is periodically calculated each sample period based on the number of IO operations to be processed during the next IO processing interval for the volume. As IO operations are received for the volume, a latency may be associated with the IO operation based on the target latency and the IO operation may be queued or synchronously processed as appropriate. Responsive to expiration of a time period that is based on at time at which a given IO operation at the head of the queue was received and the assigned latency, the given IO operation is dequeued and processed.

20 Claims, 9 Drawing Sheets

PROCESSING OF INPUT/OUPUT OPERATIONS BY A DISTRIBUTED STORAGE SYSTEM BASED ON LATENCIES ASSIGNED THERETO AT THE TIME OF RECEIPT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, NetApp, Inc.

BACKGROUND

Field

Various embodiments of the present disclosure generally relate to data storage systems. In particular, some embodiments relate to smoothing out latency spikes that would otherwise be experienced during input/output (IO) processing intervals of a distributed storage system so as to improve efficiency of and user experience with the distributed storage system by distributing latency among IO operations in accordance with respective latencies assigned to the IO operations at the time they are received.

Description of the Related Art

Multiple storage nodes organized as a cluster (also referred to herein as a distributed storage system) may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better user experience is by providing a Quality of Service feature that allows users to set a QoS that guarantees a particular level of performance for volumes. For example, QoS may guarantee a particular level of performance by provisioning minimum, maximum, and/or burst levels of input/output operations per second (IOPS) to volumes.

SUMMARY

Systems and methods are described for smoothing-out latency of IO operations processed by a distributed storage system. According to one embodiment, a target latency for input/output (IO) operations for a volume of multiple volumes of the distributed storage system by: (i) determining a target number of IO operations per second (target IOPS) to be processed during an IO processing interval for the volume; and (ii) determining the target latency by dividing the IO processing interval by the target number of IO operations. Responsive to receipt of an IO operation for the volume at a particular time, a latency is assigned to the IO operation based on the target latency. Responsive to expiration of a time period based on the particular time and the latency, the IO operation is processed.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
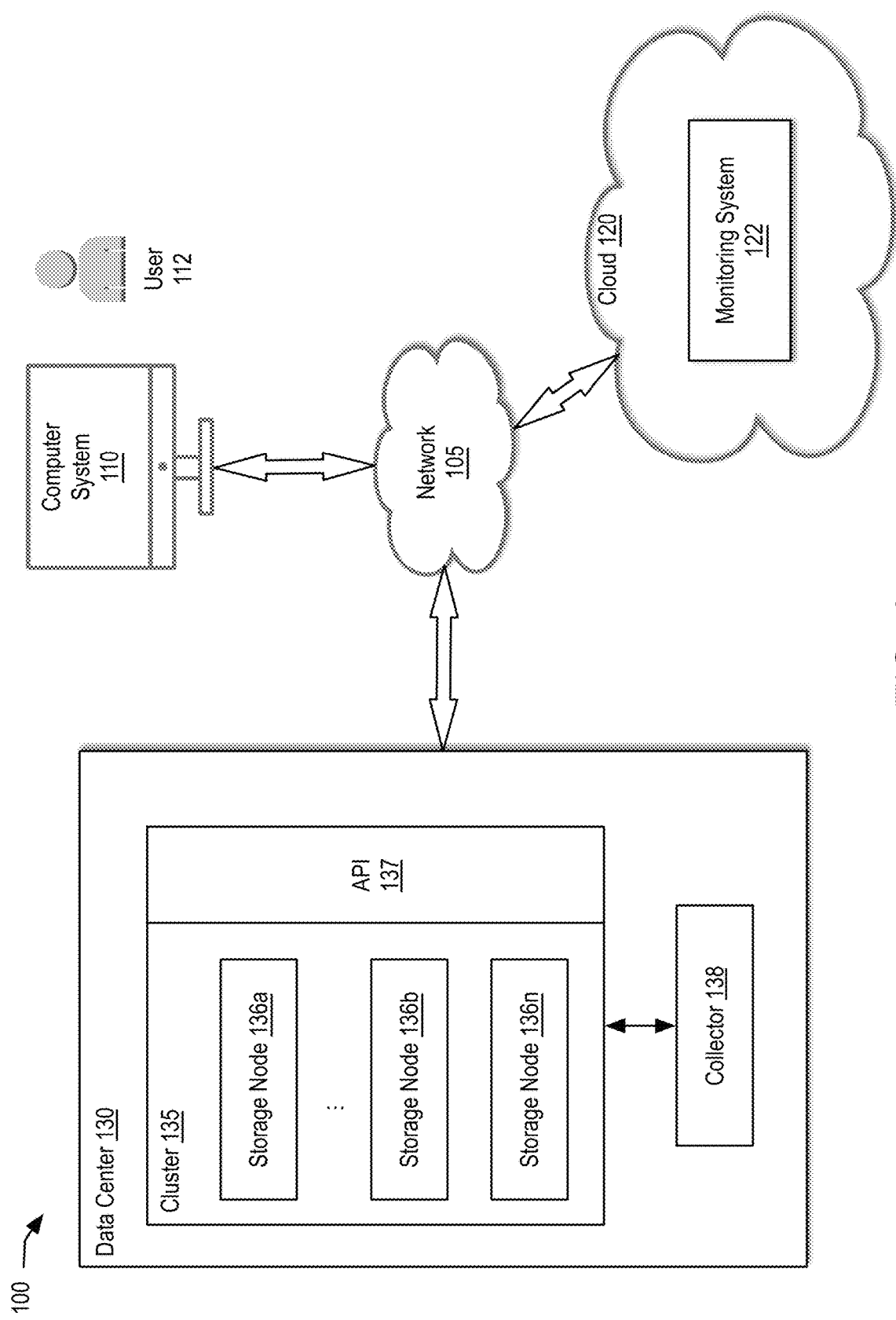
FIG. 1 is a block diagram illustrating an environment in which various embodiments may be implemented.

Systems and methods are described for smoothing-out latency of IO operations processed by a distributed storage system. One way of attempting to provide a better user experience for users of distributed storage systems is by providing a QoS feature that allows users to set a QoS that guarantees a particular level of performance for volumes of the distributed storage system. For example, QoS may guarantee a particular level of performance by provisioning minimum, maximum, and/or burst levels of input/output operations per second (IOPS) to the volumes.

A distributed storage system may divide time into IO processing intervals and periodically set a target number of IO operations that can be performed per IO processing interval based on various metrics (e.g., a measure of load on the distributed storage system and/or a measure of block storage fullness). While proper settings for various QoS parameters may enhance overall performance of the distributed storage system, spikes in IOPS may occur at the beginning of each IO processing interval as described further below with reference to FIG. 3. Spikes in IOPS for any volume hosted by a slice service of a storage node may reduce efficiency of all other volumes hosted by the same slice service and increase the latency of each of the IO operations being processed concurrently. Meanwhile, the volumes are under-utilized for the remainder of the IO processing interval after the target IOPS has been achieved.

Embodiments described herein seek to address or at least mitigate the above-mentioned inefficiencies by smoothing out latency spikes that would otherwise be experienced during input/output (IO) processing intervals of a distributed storage system. Various embodiments of the present technology provide for a wide range of technical effects, advantages, and/or improvements to computing systems and components. For example, various embodiments may include technical effects, advantages, and/or improvements relating to one or more of (i) distribution of latency more evenly over IO processing intervals of a distributed storage system; (ii) efficiency of processing of IO operations by the distributed storage system; and (iii) use of non-routine and unconventional computer operations to enhance the use of metrics to leverage average real-time data on a continuous scale rather than on an interval scale.

In the context of various examples described herein, latency is distributed among IO operations to more evenly spread processing of the IO operations over an IO processing interval. A target latency for input/output (IO) operations for a volume of multiple volumes of a distributed storage system is periodically calculated. The periodic calculation may include determining a target number of IO operations per second (target IOPS) to be processed during the IO processing interval for the volume and determining the target latency by dividing the IO processing interval by the target IOPS. As IO operations are received by the distributed storage system for the volume, a latency may be associated with the IO operation based on the target latency and the IO operation may be added to the back of a queue. Subsequently, during monitoring of the queue, responsive to expiration of a time period that is based on at time at which a given IO operation at the head of the queue was received and the assigned latency, the given IO operation is removed from the queue and processed.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

Depending upon the particular context, a "client" may be used herein to refer to a physical or virtual machine or a process running thereon. A client process may be responsible for storing, retrieving, and deleting data in the system. A client process may address pieces of data depending on the nature of the storage system and the format of the data stored. For example, the client process may reference data using a client address. The client address may take different forms. For example, in a storage system that uses file storage, the client may reference a particular volume or partition, and a file name With object storage, the client address may be a unique object name. For block storage, the client address may be a volume or partition, and a block address. Clients may communicate with metadata, corresponding to the slice services and the volume(s) residing on the slice services, using different protocols, such as SCSI, iSCSI, FC, common Internet file system (CIFS), network file system (NFS), HTTP, web-based distributed authoring and versioning (WebDAV), or a custom protocol. Each client may be associated with a volume. In some examples, only one client accesses data in a volume. In some examples, multiple clients may access data in a single volume.

As used herein, "telemetry data" generally refers to performance, configuration, load, and other system data of a monitored system. Telemetry data may refer to one data point or a range of data points. Non-limiting examples of telemetry data for a distributed storage system include latency, utilization, a number of input output operations per second (IOPS), a slice service (SS) load, Quality of Service (QoS) settings, or any other performance related information.

As used herein, "slice service load" or "SS load" generally refer to a measure of volume load per storage node of a distributed storage system. As described further below, IO operations may be throttled by the storage operating system of the distributed storage system depending upon and responsive to observation of the SS load exceeding various predefined or configurable thresholds. In one embodiment, SS load is a measure of cache (e.g., primary cache and secondary cache) capacity utilization in bytes (e.g., percent full of 8 gigabytes (GB) in the primary cache and a relatively large number of GB in the secondary cache). Depending upon the particular implementation, the SS load may be the maximum between the fullness of the primary cache and the secondary cache (e.g., a maximum among all services hosting a given volume). According to one embodiment, these two metrics, along with perceived latency, may be the inputs into the SS load calculation. For example, SS load may be the maximum value between primary cache fullness, secondary cache fullness, and latency.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The terms "component", "module", "system," and the like as used herein are intended to refer to a computer-related entity, either software-executing general-purpose processor, hardware, firmware and a combination thereof. For example, a component may be, but is not limited to being, a process running on a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Example Operating Environment

FIG. 1 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client (e.g., computer system 110).

In the context of the present example, the environment 100 is shown including a data center 130, a cloud 120, computer system 110, and a user 112. The data center 130, the cloud 120, and the computer systems 110 may be coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the given data center may be managed by a third party (or a managed service provider) on behalf of the company, which may lease the equipment and infrastructure. Alternatively, the data center 130 may represent a colocation data center in which a company rents space of a facility owned by others and located off the company premises. Data center 130 is shown including a distributed storage system (e.g., cluster 135) and a collector 138. Those of ordinary skill in the art will appreciate additional IT infrastructure may be part of the data center 130; however, discussion of such additional IT infrastructure is unnecessary to the understanding of the various embodiments described herein.

Turning now to the cluster 135, it includes multiple storage nodes 136a-n and an API 137. In the context of the present example, the multiple storage nodes 136a-n are organized as a cluster and provide a distributed storage architecture to service storage requests issued by one or more clients (e.g., computer system 110) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

The API 137 may provide an interface through which the cluster 135 is configured and/or queried by external actors (e.g., the collector 138, clients, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, API calls may be used to obtain information regarding a custom, proprietary, or standardized measure of the overall load or overall performance (e.g., IOPS) of a particular storage node 136 or to obtain information regarding the overall load or performance of multiple storage nodes 136. As those skilled in the art will appreciate various other types of telemetry data, including, but not limited to measures of latency, utilization, load, and/or performance at various levels (e.g., the cluster level, the storage node level, or the storage node component level), may be made available via the API 137 and/or used internally by various monitoring modules.

The collector 138 may be implemented locally within the same data center in which the cluster 135 resides and may periodically poll for telemetry data of the cluster 135 via the API 137. Depending upon the particular implementation, the polling may be performed at a predetermined or configurable interval (e.g., 60 seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system for local use or analysis by the user 112.

In the context of the present example, the cloud 120, which may represent a private or public cloud accessible (e.g., via a web portal) to an administrator (e.g., user 112) associated with a managed service provider, includes the monitoring system 122 that may be used to facilitate evaluation and/or selection of new QoS settings.

Systems Metrics and Load of a Distributed Storage System

A distributed storage system (e.g., cluster 135) may include a performance manager or other system metric monitoring and evaluation functionality that can monitor clients' use of the distributed storage system's resources. In addition, the performance manager and/or a QoS system (e.g., a QoS module) may be involved in the regulation of a client's use of the distributed storage system. The client's use of the distributed storage system can be adjusted based upon one or more of system metrics, the client's QoS settings, and the load of the distributed storage system. System metrics may be various measurable attributes of the distributed storage system that may represent directly or be used to calculate a load of the distributed storage system, which, as described in greater detail below, can be used to throttle clients of the distributed storage system.

System metrics are metrics that reflect the use of the system or components of the distributed storage system by all clients. System metrics can include metrics associated with the entire distributed storage system or with components within the distributed storage system. For example, system metrics can be calculated at the system level, cluster level, node level, service level, or drive level. Space utilization of is one example of a system metric. The cluster space utilization reflects how much space is available for a particular cluster, while the drive space utilization metric reflects how much space is available for a particular drive. Space utilization metrics can also be determined at the system level (e.g., the percentage of configured block storage remaining available within the distributed storage system), service level, and the node level. Other examples of system metrics include measured or aggregated metrics such as read latency, write latency, IOPS, read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients and the volume of data. Read latency may represent the time taken for the distributed storage system to read data from a volume and return the data to a client. Write latency may represent the time taken for the distributed storage system to write data and return a success indicator to the client. Workload type can indicate if IO access is sequential or random. The data type can identify the type of data being accessed/written, e.g., text, video, images, audio, etc. The write cache capacity may refer to a write cache or a node, a block server, or a volume server. The write cache may be implemented in the form of a relatively fast memory that is used to store data before it is written to storage. As noted above, each of these metrics can be independently calculated for the system, a cluster, a node, etc. In addition, these values can also be calculated at a client level.

IOPS may be calculated based on latency and the number of concurrent outstanding read and/or write operations that may be queued (QueueDepth) by the distributed storage system as follows:

IOPS=QueueDepth/Latency

Bandwidth may be calculated based on QueueDepth, latency and I/O size as follows:

Bandwidth=(QueueDepth*IOSize)/Latency where, IOSize is the average I/O size over a period of time (typically, falling between 4 KB to 32 KB, inclusive)

System metrics may be calculated over a period of time, e.g., 250 milliseconds (ms), 500 ms, 1 second (s), etc., that may be referred to herein as a sample period or sampling interval. Accordingly, different values such as a min, max, standard deviation, average, etc., can be calculated for each system metric. One or more of the metrics may directly represent and/or be used to calculate a value that represents a load of the distributed storage system. Loads can be calculated for the distributed storage system as a whole, for individual components, for individual services, and/or individual clients. System load values may then be used by the QoS system to determine whether and how clients are to be throttled.

In some embodiments, performance for individual clients may be adjusted based upon the monitored system metrics. For example, based on a number of factors (e.g., system metrics and client QoS settings), a number of IO operations that can be performed by a particular client over a period of time (referred to herein as an IO processing interval) may be managed. As described in further detail below, the performance manager and/or the QoS system may regulate the number of IO operations that are performed by delaying IO operations submitted by clients by some amount, for example, as determined by a calculated target latency, before allowing the IO operations to proceed. In one implementation, responsive to a client exceeding a QoS bound assigned to it and/or responsive the aggregate of IO operations received from all clients during a particular IO processing interval exceeding certain defined limits, the performance manager and/or the QoS system may regulate the number of IOPS that are performed by locking a client out of a volume for different amounts of time to manage how many IOPS can be performed by the client. For example, in accordance with an approach referred to herein as IOPS push back and described further below with reference to FIG. 5, when a client is heavily restricted, the client may be locked out of accessing a volume for 450 ms of every 500 ms and when the client is not heavily restricted, the client may be blocked out of a volume for 50 ms of every 500 ms. As such, in this example, the lockout effectively manages the number of IOPS that the client may perform every 500 ms. Although examples using IOPS are described, other metrics may also be used, as will be described in more detail below.

Client Quality of Service (QoS) Parameter Settings

In addition to system metrics, client quality of service (QoS) parameters can be used to affect how a client uses the distributed storage system. Unlike metrics, client QoS parameters are not measured values, but rather represent variables that can be set to define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value. When a volume is in an overload situation, the minimum IOPS value is the minimum number of IOPS that the distributed storage system attempts to provide the client. However, based upon cluster performance, an individual client's IOPS may be lower or higher than the minimum value during an overload situation.

In one implementation, the distributed storage system can be provisioned such that the sum of the minimum IOPS across all clients can be sustained for all clients at a given time. In this situation, each client should be able to perform at or above its minimum IOPS value. The distributed storage system, however, can also be provisioned such that the sum of the minimum IOPS across all clients cannot be sustained for all clients. In this case, if the distributed storage system becomes overloaded through the use of all clients, the client's realized IOPS can be less than the client's minimum IOPS value. In failure situations, the distributed storage system may also throttle users such that their realized IOPS are less than their minimum IOPS value. A maximum IOPS parameter is the maximum sustained IOPS value over an extended period of time. The burst IOPS parameter is the maximum IOPS value that a client can "burst" above the maximum IOPS parameter for a short period of time based upon credits. In one implementation, credits for a client are accrued when a given client is operating under its respective maximum IOPS parameter. Accordingly, clients may be limited to use of the distributed storage system in accordance with their respective maximum IOPS and burst IOPS parameters. For example, a given client may not be able to use the distributed storage system's full resources, even if they are available, but rather, may be bounded by the respective maximum IOPS and burst IOPS parameters of the given client. In some embodiments, client QoS parameters can be changed at any time by the client, an administrator, and/or by automated means.

Example Storage Node

Figure 2:
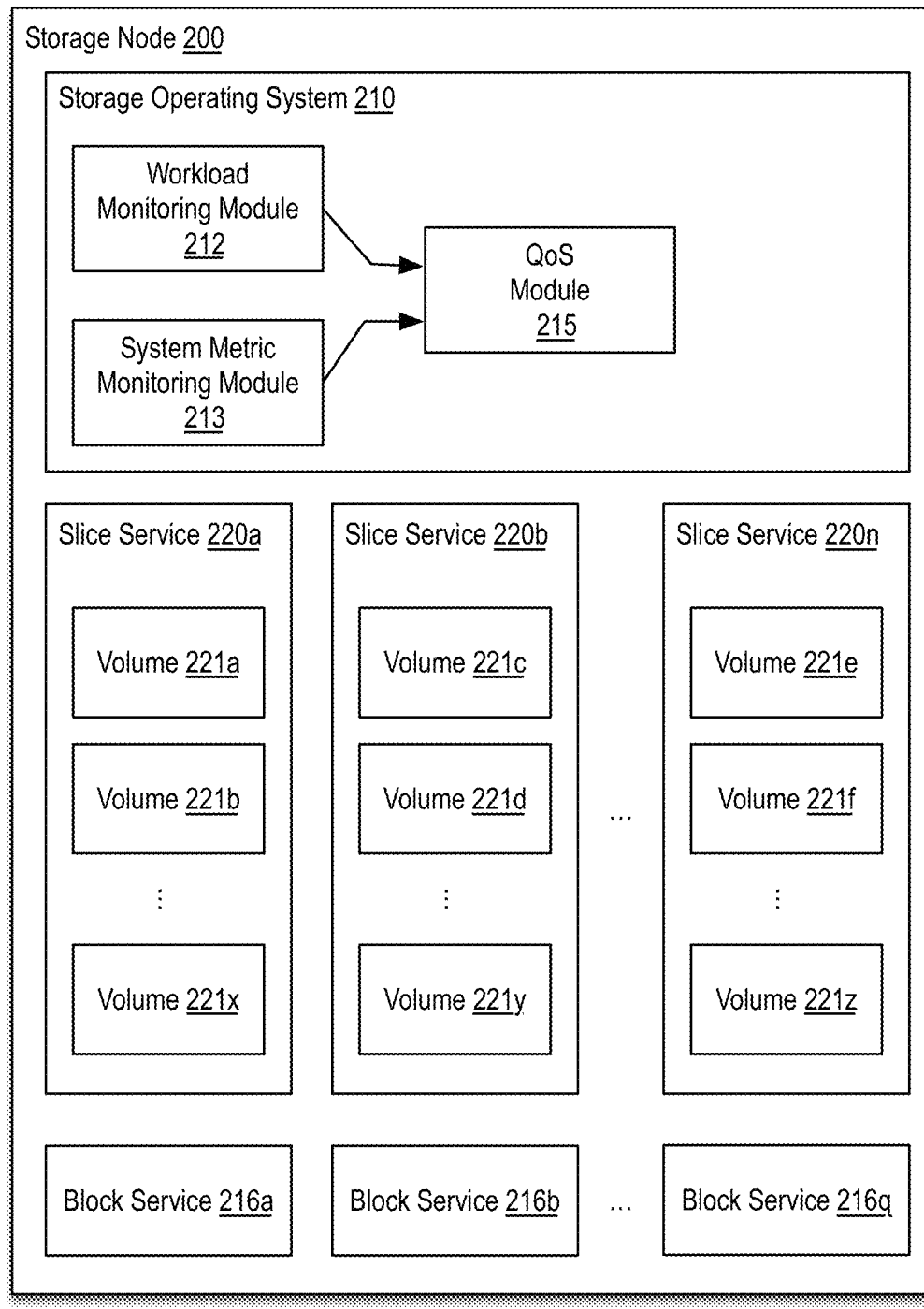
FIG. 2 is a block diagram illustrating a storage node in accordance with an embodiment of the present disclosure.

FIG. 2 is a block diagram illustrating a storage node 200 in accordance with an embodiment of the present disclosure. Storage node 200 represents a non-limiting example of storage nodes 136a-n. In the context of the present example, storage node 200 may include a storage operating system (OS) 210, one or more slice services 220a-n, and one or more block services 216a-q. The storage OS 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes. In the context of the present example, the storage OS 210 also includes a QoS module 215, a workload monitoring module 212, and a system metric monitoring module 213.

The QoS module 215 may be responsible for, among other things, applying QoS settings (e.g., as requested by clients) to one or more volumes utilized by the clients, periodically calculating a target latency for IO operations, placing the IO operations on a queue with an assigned latency based on the target latency, and monitoring of the queue to cause the IO operations to be processed within the assigned latency. A non-limiting example of periodic latency calculation is described in further detail below with reference to FIG. 4. A non-limiting example of IO operation queuing and latency assignment is described in further detail below with reference to FIG. 6. A non-limiting example of IO queue monitoring processing is described in further detail below with reference to FIG. 8.

While various examples herein may be described with reference to a minimum IOPS, a maximum IOPS, and a burst IOPS as an example set of QoS settings, it is to be appreciated the various approaches for automated tuning of QoS settings described herein are equally applicable to various other individual QoS settings and to sets of one or more QoS settings, including, but not limited to a read latency parameter, a write latency parameter, a total IOPS parameter, a read IOPS parameter, a write IOPS parameter, an I/O size parameter, a total bandwidth parameter, a read bandwidth parameter, a write bandwidth parameter, and a read/write IOPS ratio parameter. While in the context of the present example, a single instance of the QoS module 215 is shown within the storage OS 210, an instance of the QoS module 215 may alternatively be implemented within each of the slice services 220a-n.

The workload monitoring module 212 may be responsible for monitoring and evaluating information (e.g., IOPS) indicative of a workload to which the storage node 200 is exposed. While various examples described herein may be described in the context of a total number of IOPS, it is to be appreciated the various approaches for automated tuning of QoS settings described herein are equally applicable to other individual characteristics of a workload or sets of one or more workload characteristics, including, but not limited to a number of read IOPS, a number of write IOPS, a proportion of read IOPS to write IOPS, an I/O size, and a statistical measure of any of the foregoing over a period of time.

The system metric monitoring module 213 may be responsible for monitoring and calculating a measure of load on the cluster as a whole and/or at various levels or layers of the cluster or the storage node 200. For example, metrics may be available for individual or groups of storage nodes (e.g., storage nodes 136a-n), individual or groups of volumes 221, individual or groups of slice services 220, and/or individual or groups of block services 216.

The QoS module 215, the workload monitoring module 212, and the system metric monitoring module 213 may periodically monitor and collect QoS settings, workload characteristics, and/or system metrics every sampling period (e.g., 500 ms). In addition, the QoS module 215 may periodically (e.g., every sampling period) make use of the collected data/metrics directly or indirectly to perform a latency calculation for use in connection with distributing latency among multiple IO operations as described below.

While various examples described herein may be described with reference to the use of SS load as an example system load metric, it is to be appreciated the various approaches for automated tuning of QoS settings described herein are equally applicable various other individual system metrics and to sets of one or more system metrics, including, but not limited to a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, and a read/write bandwidth ratio metric.

Turning now to the slice services 220a-n, each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 216a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 216. For example, slice services 220 may map between the client addressing used by the client systems (e.g., file names, object names, block numbers, etc. such as Logical Block Addresses (LBAs)) and block layer addressing (e.g., block identifiers) used in block services 216. Further, block services 216 may map between the block layer addressing (e.g., block identifiers) and the physical location of the data block on one or more storage devices. The blocks may be organized within bins maintained by the block services 216 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 216a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

In some examples, data may be locally stored in a primary cache in a storage controller's dynamic random-access memory (DRAM) after a host read to improve read performance Additionally, a secondary cache consisting of a set of SSD drives may be used in combination with the primary cached. The set of SSD drives may be logically grouped together as a volume to facilitate movement of data to and from the secondary cache via simple volume I/O mechanisms. After data is cached and stored on the SSDs, subsequent reads of that data are performed on the SSD Cache, thereby eliminating the need to access the HDD volume. In some embodiments, IO operations may be throttled by the storage OS 210 depending upon and responsive to one or more system metrics (e.g., SS load and/or a measure of fullness of block storage) exceeding various predefined or configurable thresholds. A graph illustrating an example of IOPS push back is described below with reference to FIG. 5.

Latency Distribution

Figure 3:
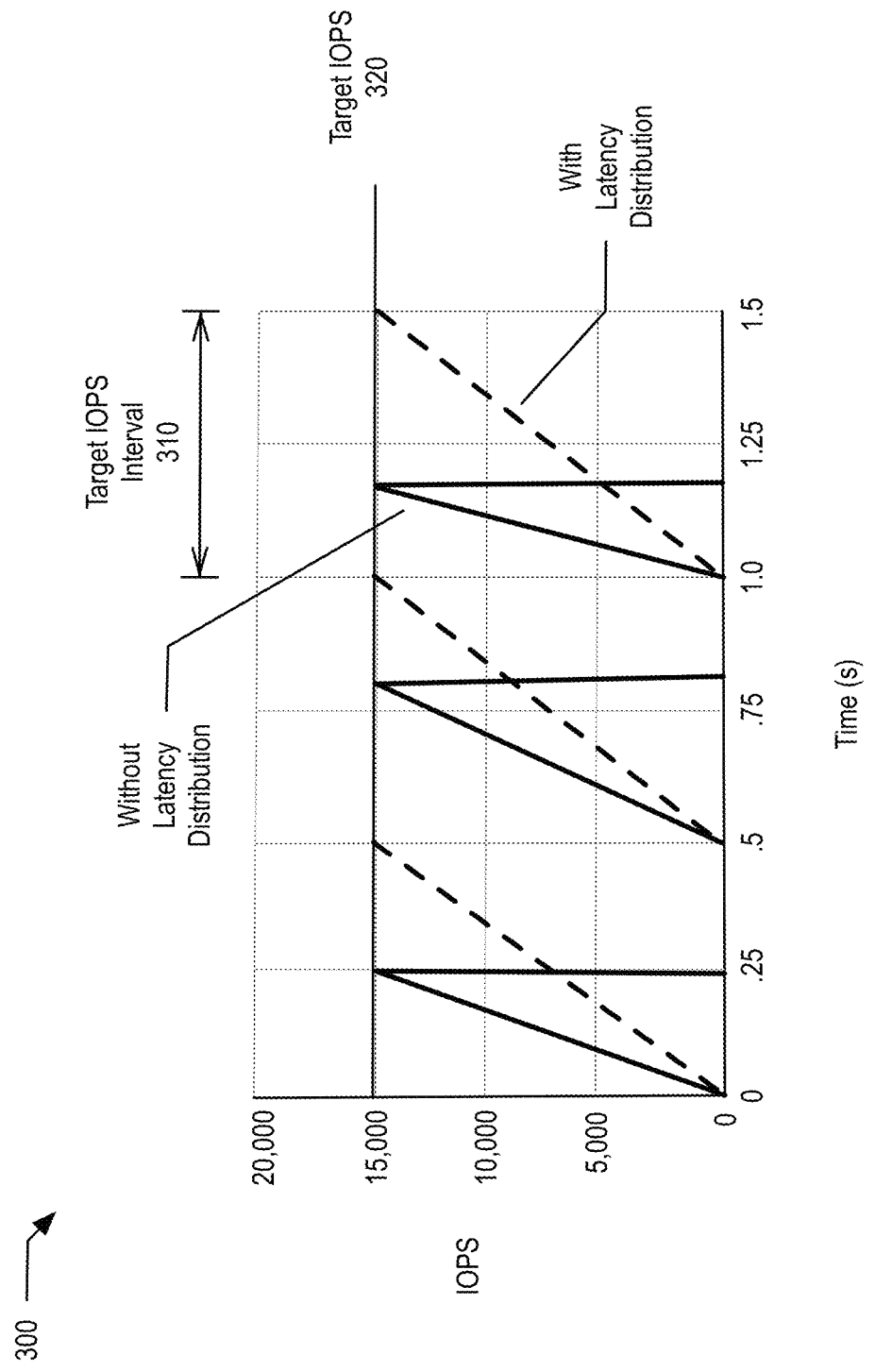
FIG. 3 is a graph illustrating the difference between an IO processing approach that distributes latency among multiple IO operations for an IO processing interval and one that does not.

FIG. 3 is a graph 300 illustrating the difference between an IO processing approach that distributes latency among multiple IO operations for an IO processing interval and one that does not. The graph 300 depicts three IO processing intervals (e.g., target IOPS interval 310) during which a distributed storage system processes a target number of IO operations per second (e.g., target IOPS 320) per IO processing interval. In the context of the present example, the target IOPS interval 310 is 500 ms, but it may be shorter or longer. In some examples, the target IOPS 320 is periodically calculated for the next IO processing interval based on various metrics (e.g., a measure of load on the distributed storage system and/or a measure of block storage fullness) collected during a sample period (which may be the same duration as the target IOPS interval).

In the context of the present example, the solid lines illustrate IOPS over time in a scenario in which latency distribution is not performed. Since latencies area not assigned to the IO operations, spikes in IOPS may be observed at the beginning of each target IOPS interval as numerous pending IO operations (some carried over from a prior target IOPS interval) are processed concurrently. As noted above such spikes in IOPS for any volume (e.g., volume 221a) hosted by a slice service (e.g., slice service 220a) of a storage node (e.g., storage node 200) may reduce efficiency of all other volumes (e.g., volumes 221b-x) hosted by the same slice service and increase the latency of each of the IO operations being processed concurrently. Meanwhile, the volumes are under-utilized for the remainder of the IO processing interval after the target IOPS 320 has been achieved.

Embodiments described herein seek to address or at least mitigate the above-mentioned inefficiencies by smoothing out latency spikes that would otherwise be experienced during the IO processing intervals. In the context of the present example, the dashed lines illustrate IOPS over time in a scenario in which a latency distribution approach in accordance with various embodiments described herein is performed. As can be seen, the slope or steepness of the dashed lines as IOPS is increasing during the IO processing intervals is less than that of the corresponding solid lines, thereby more uniformly spreading the performance of the IO operations over the IO processing intervals and lessening latency spikes.

One potential way to achieve such a result is by shrinking the target IOPS interval and the sample period to zero; however, such an approach would increase overhead costs due to more frequent sampling. As described in further detail below, latency distribution may be accomplished by maintaining the notion of a target IOPS interval and a sampling period and adding on top of that the new features of calculating a target latency and application of latencies to IO operations based on the target latency as they are received by the distributed storage system.

Target Latency Calculation

Figure 4:
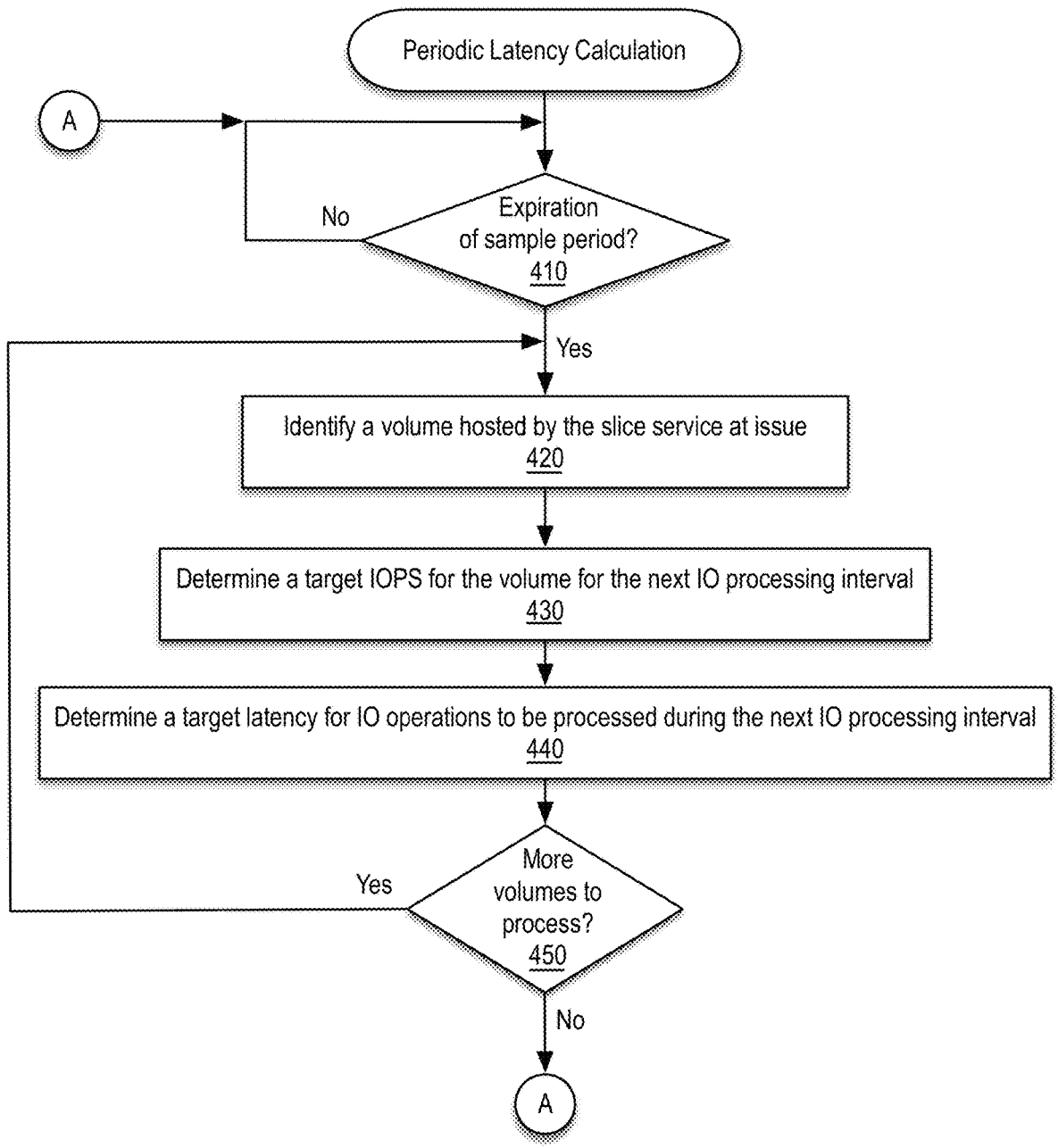
FIG. 4 is a flow diagram illustrating a set of operations for periodically determining a target latency for an IO processing interval in accordance with an embodiment of the present disclosure.

FIG. 4 is a flow diagram illustrating a set of operations for periodically determining a target latency for an IO processing interval in accordance with an embodiment of the present disclosure. The various blocks of the flow diagrams of FIGS. 4, 6, and 8 may be executed by a computing device (e.g., a processor, processing circuit, and/or other suitable component, for example, of a storage node (e.g., storage node 200)). In the context of various examples, latency calculation, IO operation queuing and latency assignment, and IO queue monitoring may be described with reference to a QoS module (e.g., QoS module 215) implemented within a storage operating system (e.g., storage operating system 210) or slice services (e.g., slice service 220a-n) of each storage node of a distributed storage system (e.g., cluster 135).

At decision block 410, a determination is made regarding whether a sample period has expired. If so, processing continues with block 420; otherwise processing loops back to decision block 410. During the sample period (e.g., 500 ms), various data may be collected and metrics (e.g., a measure of volume load per storage node of the distributed storage system and/or a measure of fullness of block storage available within the distributed storage system) may be calculated. In one embodiment, the metrics may be based on data collected during the sample period. Alternatively, if hysteresis is desired, the metrics may be based in part (e.g., 30%) on accumulated past data from prior sample periods and based in part (e.g., 70%) on data gathered from the current sample period. In this manner, the metrics may leverage average real-time data on a continuous scale rather than on an interval scale. A non-limiting example of the measure of load is SS load.

At block 420, a volume hosted by the slice service for which the QoS module is performing the latency calculation is identified.

At block 430, a target IOPS for the volume is determined for the next IO processing interval (e.g., target IOPS interval 310). According to one embodiment, the target IOPS is based on one or both of a target SS load and a target fullness of block storage of the distributed storage system as described further below with reference to FIG. 5.

At block 440 a target latency for IO operators to be processed during the next IO processing interval is determined. According to one embodiment, the target latency may be determined based on the target IOPS and the IO processing interval. For example, the target latency for IO operations for the volume during the next IO processing interval may be calculated by dividing the number of IO operations by the duration of the IO processing interval in seconds.

At decision block 450, a determination is made regarding whether another volume is to be processed. If so, processing loops back to block 420 where another volume hosted by the slice service is identified; otherwise, processing for the volumes hosted by the slice service is complete. According to one embodiment, all volumes or a subset of all volumes of a slice service may be processed.

While, for simplicity, in the context of the present example, the periodic latency calculation is described with reference to a single slice service within a single storage node, it is to be appreciated the periodic latency calculation may be performed for each slice service of each storage node of the distributed storage system.

While in the context of the present example and in the context of subsequent flow diagrams, a number of enumerated blocks are included, it is to be understood that embodiments may include additional blocks before, after, and/or in between the enumerated blocks. Similarly, in some embodiments, one or more of the enumerated blocks may be omitted or performed in a different order.

IOPS Push Back

Figure 5:
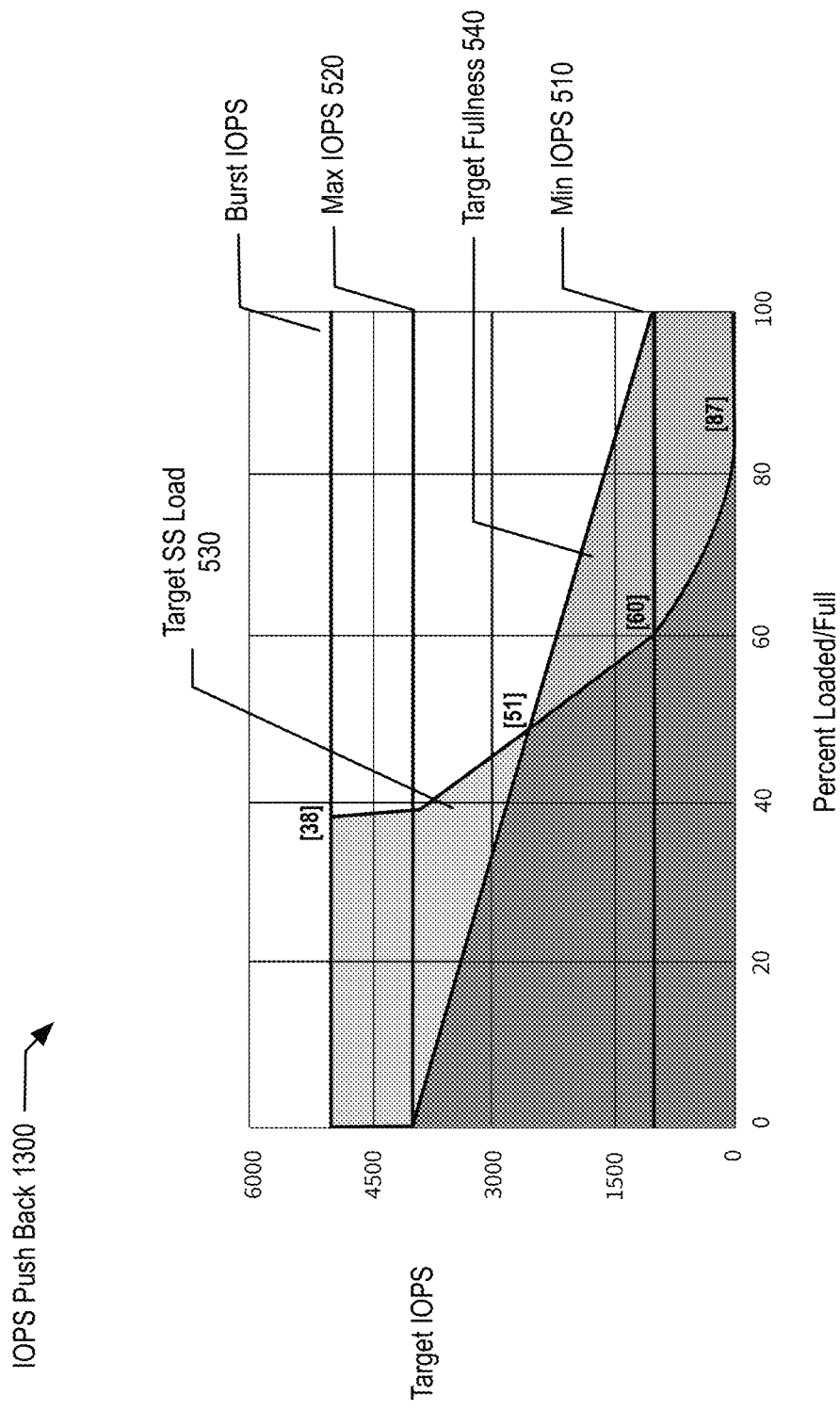
FIG. 5 is a graph illustrating IOPS push back in accordance with an embodiment of the present disclosure.

FIG. 5 is a graph illustrating IOPS push back 500 in accordance with an embodiment of the present disclosure. In one embodiment, the IOPS pushback 500 is performed according to a percent loaded/full calculation (e.g., determined by a system metric monitoring module (e.g., system metric monitoring module 213) and/or by a QoS module (e.g., QoS module 215)). The percent loaded/full calculation may involve selecting a maximum target IOPS that satisfies both a target SS load 530 for a given slice service (e.g., slice service 220a) and a target fullness 540 relating to a target fullness of block storage of the distributed storage system as a whole. In various embodiments, the target SS load 530 generally represents a value on a scale of 0-100 indicative of a load at or below which it is desired to operate the given slice service. Similarly, the target fullness 540 may represent a value on a scale of 0-100 indicative of a fullness at or below which it is desired to maintain block storage of the distributed storage system.

As shown in the present example, when the target SS load 530 is within a first range (e.g., between 0 and 37, inclusive), the storage OS (e.g., storage OS 210) does not throttle the volumes residing on the particular slice service. When the target SS Load 530 is within a second range (e.g., between 38-59, inclusive), the storage OS may throttle multiple volumes (e.g., all of volumes 212a-212x) residing on the particular slice service linearly from the maximum IOPS value 320 (e.g., 4,000 IOPS) to the minimum IOPS value 310 (e.g., 1,000 IOPS) based on the client QoS settings. If, instead, the target SS Load 530 is within a third range (e.g., between 60-100, inclusive), the storage OS may throttle multiple volumes (e.g., all volumes 212a-212x) residing on the particular slice service using an inverse exponential function towards 0.

In the context of the present example, for its part, the target fullness 540 may further limit the target IOPS within a first range (e.g., between 0 and 50, inclusive), in which the storage OS linearly increases push back on the target IOPS as the target fullness 540 increases. As shown in the present example, the target fullness 540 operates as the limiting factor for target IOPS when the value of the target fullness 540 is in the first range between 0 and 50, inclusive, whereas the target SS load 530 operates as the limiting factor for target IOPS when the value of the target fullness 540 is in a second range between 51 and 100, inclusive.

IO Operation Queuing and Latency Assignment

Figure 6:
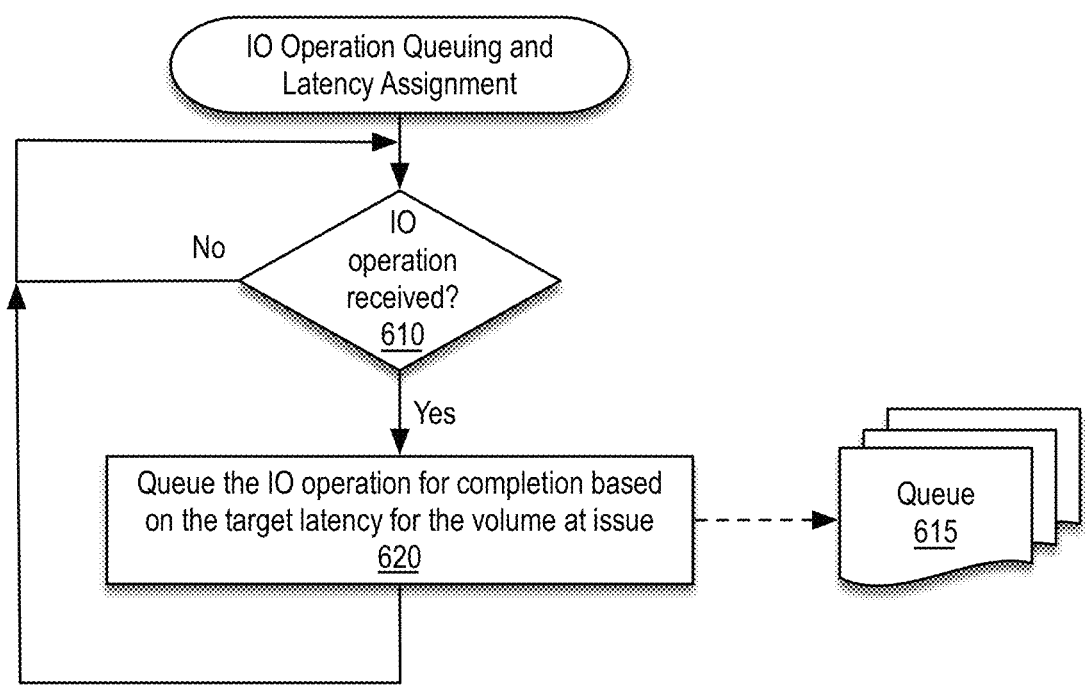
FIG. 6 is a flow diagram illustrating a set of operations for performing IO operation queuing and latency assignment in accordance with an embodiment of the present disclosure.
Figure 7:
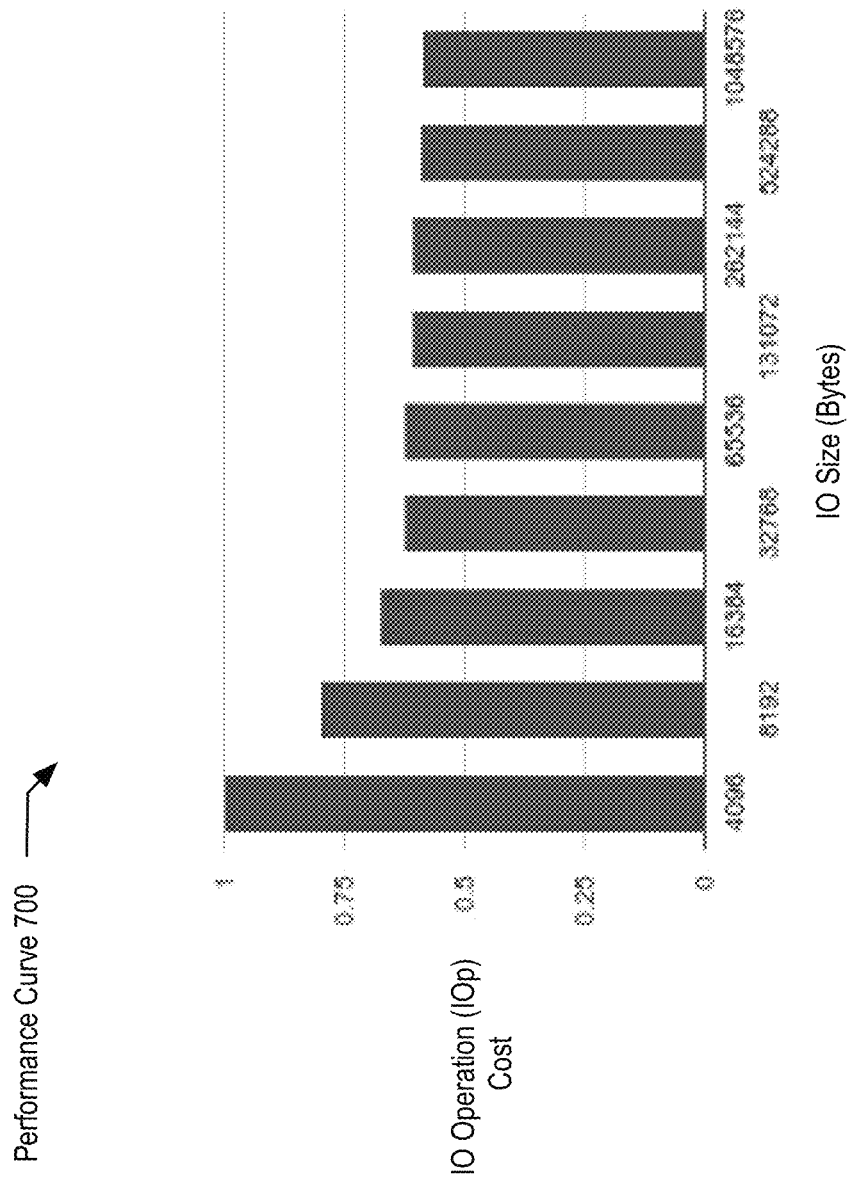
FIG. 7 is a graph illustrating a performance curve that may be used to normalize latency values assigned to IO operations of different IO sizes in accordance with an embodiment of the present disclosure.

FIG. 6 is a flow diagram illustrating a set of operations for performing IO operation queuing and latency assignment in accordance with an embodiment of the present disclosure. At decision block 610, a determination is made regarding whether an IO operation has been received. If so, processing continues with block 620; otherwise processing loops back to decision block 610. As described further below, in some examples, multiple IO sizes may be supported (e.g., IO operations involving block sizes of 4 kilobytes (KB), 8 KB, 16 KB, 32 KB, 64 KB, 132 KB, 256 KB, 512 KB, and/or 1,024 KB) of data. As depicted in the performance curve 700 of FIG. 7, the cost of performing a single IO operation of different IO sizes may vary. For example, as indicated by the performance curve 700, the cost of performing an IO operation on an 8 KB block is less than performing two IO operations on 4 KB blocks. Similarly, the cost of performing an IO operation on a 16 KB block is less than performing four IO operations on 4 KB blocks. As can be seen in FIG. 7, the amount of cost savings begins to taper off at about IO operations having an IO size of 64 KB.

At block 620, the IO operation is placed on an IO queue (e.g., queue 615) for completion based on the target latency for the volume at issue. Depending upon the particular implementation, IO operations may be assigned a queue latency equal to the target latency previously calculated (e.g., at block 440 of FIG. 4). In some embodiments, the queue latency assigned to an IO operation may be adjusted and/or normalized based on various factors. For example, the average/expected latency of the remaining IO path (i.e., the total path length) that the operation is expected to endure may be taken into consideration, for example, by subtracting the average/expected latency of the remaining IO path from the target latency. In this manner, just enough extra queue latency may be dynamically added to achieve a smooth distribution of IO operation processing from end-to-end.

As a non-limiting example of taking into consideration the average/expected latency of the remaining IO path, consider a scenario in which 4K IO operations (i.e., IO operations of size 4 KB) have been taking ~4 ms to process, and the target latency for the current IO processing interval is 10 ms. In this example, a queue latency of 6 ms may be assigned to each 4K IO, since it is expected that each will experience another 4 ms of latency as it traverses the remaining IO path.

The target latency may additionally or alternatively be normalized to account for different IO sizes, for example, by normalizing the average latency down to the smallest IO size supported by the distributed storage system. According to one embodiment, a normalization factor may be determined based on a particular performance curve (e.g., performance curve 700) indicative of the relative costs of performing IO operations of different sizes in the context of the particular distributed storage system. In one embodiment, the normalization factor may be equal to the IO operation cost as indicated by the particular performance curve. Using the performance curve 700 as a non-limiting example, the normalization factor for 4K IO operations may be 1, the normalization factor for 8K IO operations may be 0.8, the normalization factor for 16K IO operations may be 0.65, and so on. Assuming the use of a normalization factor alone, a queue latency assigned to a particular IO operation may be determined by multiplying the target latency by the normalization factor.

After any adjustments and/or normalization has been applied, the resulting queue latency may then be associated with or assigned to the IO operation by including information indicative of an absolute time or a relative time within the queue entry. For example, the queue entry for a particular IO operation may include a time stamp indicative of the time the IO operation was received plus the latency or the queue entry may include a countdown timer field initially set to the latency. Information identifying the object issuing the IO operation may also be stored within the queue entry to facilitate subsequent notification to the object when the IO operation is permitted to proceed.

While in the context of the present example, all IO operations are shown as being queued as a result of block 620, it is to be understood IO operations may be assigned a queue latency of 0 ms, thereby causing such IO operations to move through the QoS system synchronously without being placed on the queue 615. For instance, in the context of the example described above in connection with block 620 relating to the taking into consideration of the average/expected latency, assume now instead of average IO path latencies of ~4 ms the IO path latencies have been ~15 ms on average. In such a scenario, subtracting the IO path latencies from the target latency (e.g., 10 ms) is a negative number, which may result in assigning a queue latency of 0 ms to each 4K IO, effectively making all future IOs move through the QoS system synchronously (i.e., no queueing). When an IO operation is not placed on the queue 615, a token may be synchronously issued to the object that made the IO request to allow the object to complete the read or write operation via the slice service hosting the volume with which the read or write operation is associated. For those IO operations that are placed on the queue 615, they may be processed as described further below with reference to FIG. 8.

IO Queue Monitoring

Figure 8:
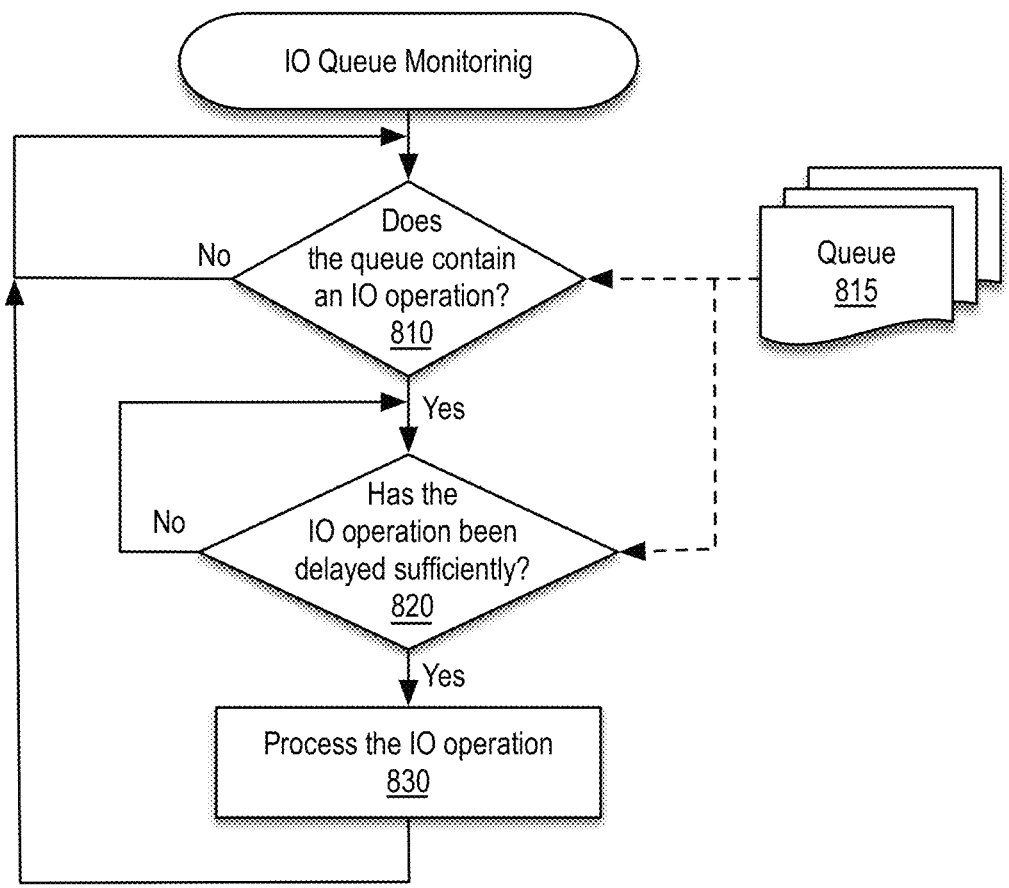
FIG. 8 is a flow diagram illustrating a set of operations for monitoring an IO queue in accordance with an embodiment of the present disclosure.

FIG. 8 is a flow diagram illustrating a set of operations for monitoring an IO queue in accordance with an embodiment of the present disclosure. At decision block 810, a determination is made regarding whether an IO queue (e.g., queue 815) contains an IO operation. If so, processing continues with decision block 820; otherwise, processing loops back to decision block 810.

At decision block 820, it is determined whether the IO operation has been delayed sufficiently. If so, processing continues with block 830; otherwise, processing loops back to decision block 820. The IO operation may be queued with information indicative of a latency assigned to the IO operation. According to one embodiment, the assigned latency value for the JO operation may be represented as absolute time or a relative time (e.g., a countdown timer) from the time at which the IO operation was received. In such situations, when a difference between the current time and the absolute time is within a predetermined or configurable threshold (e.g., 5 ms) of the current time or when the countdown timer is within the predetermined or configurable threshold, the QoS module may determine the IO operation has been delayed sufficiently.

At block 830, the IO operation is processed. According to one embodiment, the JO operation is removed from the head of the queue and a token is asynchronously issued to the object that made the IO request to allow the object to complete the read or write operation via the slice service hosting the volume with which the read or write operation is associated.

While in the context of the examples of FIG. 6 and FIG. 8 all IO operations are described as being temporarily queued and tokens authorizing the IO operations are issued asynchronously after the IO operations have been sufficiently delayed, in alternative embodiments, short-cut processing may be performed in some circumstances. For example, prior to queuing IO operations onto an empty IO queue they may be evaluated to determine whether they are within the predetermined or configurable threshold; and if so, a token may be synchronously issued to the requesting object; otherwise, the IO operation may be queued as described above.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
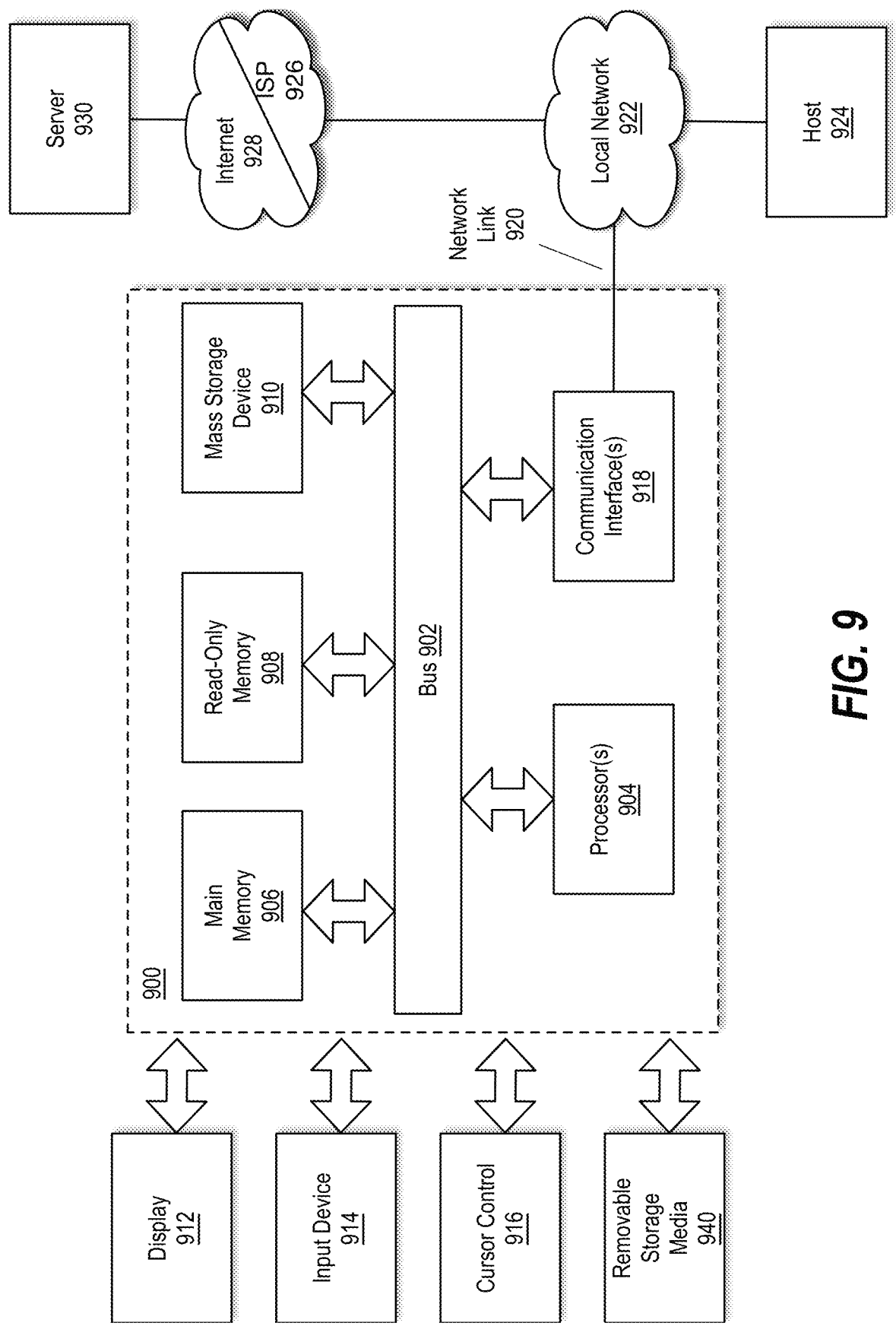
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources associated with a storage node (e.g., storage node 136), a collector (e.g., collector 138), a monitoring system (e.g., monitoring system 122) or an administrative workstation or client (e.g., computer system 110). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., a hardware processor 904) coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read—Only Memory (CD-ROM), Compact Disc-Re-Writable (CD-RW), Digital Video Disk-Read—Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A method performed by a processing resource of a distributed storage system, the method comprising:
    calculating a target latency for input/output (IO) operations for a volume of a plurality of volumes of the distributed storage system by:
        monitoring and calculating one or more system metrics for the distributed storage system as a whole, wherein the one or more system metrics include one or both of a measure of load on the distributed storage system and a measure of fullness of block storage available within the distributed storage system;
        determining a target number of IO operations per second (target IOPS) to be processed during an IO processing interval for the volume based on the one or more system metrics; and
        determining the target latency by dividing the IO processing interval by the target number of IO operations;
    responsive to receipt of an IO operation for the volume at a particular time, assigning a latency to the IO operation based on the target latency; and
    responsive to expiration of a time period based on the particular time and the latency, processing the IO operation.

2. The method of claim 1, wherein said processing of the IO operation is performed synchronously when the assigned latency is less than or equal to zero.

3. The method of claim 1, further comprising periodically re-calculating the target latency.

4. The method of claim 1, wherein said calculating is performed for each of multiple volumes of the plurality of volumes hosted by the slice service.

5. The method of claim 1, further comprising calculating the latency by one or more of normalizing the target latency to account for an IO size of the IO operation and taking into consideration an average or expected latency of a remaining IO path.

6. The method of claim 5, wherein said normalizing comprises:
    determining a normalization factor based on a performance curve indicative of relative costs of performing IO operations for a plurality of different IO sizes; and
    applying the normalization factor to the target latency.

7. The method of claim 1, wherein the IO processing interval comprises 500 milliseconds.

8. The method of claim 1, wherein the measure of load on the distributed storage system comprises a slice service load.

9. A distributed storage system comprising:
    a processing resource; and
    a non-transitory computer-readable medium, coupled to the processing resource, having stored therein instructions that when executed by the processing resource cause the distributed storage system to:
        for each volume of a plurality of volumes of the distributed storage system, periodically calculate a target latency for input/output (IO) operations to be processed for the volume during an IO processing interval by:
            monitoring and calculating one or more system metrics of the distributed storage system, including one or more of a measure of load on the distributed storage system and a measure of fullness of block storage available within the distributed storage system;
            determining a target number of IO operations per second (target IOPS) to be processed during the IO processing interval for the volume based on the one or more system metrics; and
            determining the target latency by dividing the IO processing interval by the target number of IO operations; and
        smooth-out latency experienced by IO operations received by the distributed storage system by:
            responsive to receipt of an IO operation for a given volume of the plurality of volumes at a particular time, delaying processing of the IO operation by placing the IO operation on a queue and associating a latency with the IO operation based on the target latency for the given volume; and
            responsive to expiration of a time period based on the first time and the latency, removing the IO operation from the queue and processing the IO operation.

10. The distributed storage system of claim 9, wherein execution of the instructions further cause the distributed storage system to calculate the latency by normalizing the target latency to account for an IO size of the IO operation.

11. The distributed storage system of claim 9, wherein said normalizing further comprises:
    determining a normalization factor based on a performance curve indicative of relative costs of performing IO operations for a plurality of different IO sizes; and
    applying the normalization factor to the target latency.

12. The distributed storage system of claim 9, wherein the measure of load on the distributed storage system comprises a slice service load.

13. The distributed storage system of claim 9, wherein the IO processing interval is less than 1 second.

14. A non-transitory computer-readable storage medium embodying a set of instructions, which when executed by a processing resource of a distributed storage system cause the distributed storage system to:
    calculate a target latency for input/output (IO) operations for a volume of a plurality of volumes of the distributed storage system by:
        monitoring and calculating one or more system metrics of the distributed storage system, including one or more of a measure of load on the distributed storage system and a measure of fullness of block storage available within the distributed storage system;
        determining a target number of IO operations per second (target IOPS) to be processed during an IO processing interval for the volume based on the one or more system metrics; and determining the target latency by dividing the IO processing interval by the target number of IO operations;

responsive to receipt of an IO operation for the volume at a particular time, assign a latency to the IO operation based on the target latency; and responsive to expiration of a time period based on the particular time and the latency, process the IO operation.

15. The non-transitory computer-readable storage medium of claim 14, wherein execution of the instructions by the processing resource further cause the distributed storage system to periodically re-calculate the target latency.

16. The non-transitory computer-readable storage medium of claim 14, wherein the target latency is calculated for each of multiple volumes of the plurality of volumes hosted by the slice service.

17. The non-transitory computer-readable storage medium of claim 14, wherein the latency is calculated by normalizing the target latency to account for an IO size of the IO operation.

18. The non-transitory computer-readable storage medium of claim 17, wherein said normalizing comprises:

determining a normalization factor based on a performance curve indicative of relative costs of performing IO operations for a plurality of different IO sizes; and applying the normalization factor to the target latency.

19. The non-transitory computer-readable storage medium of claim 14, wherein the measure of load on the distributed storage system comprises a slice service load.

20. The non-transitory computer-readable storage medium of claim 14, wherein the IO processing interval is less than 1 second.

* * * * *